Aug. 14, 1951     T. M. O'HARA     2,564,211
VARIABLE-SPEED COUPLING
Filed Oct. 12, 1949     2 Sheets-Sheet 1
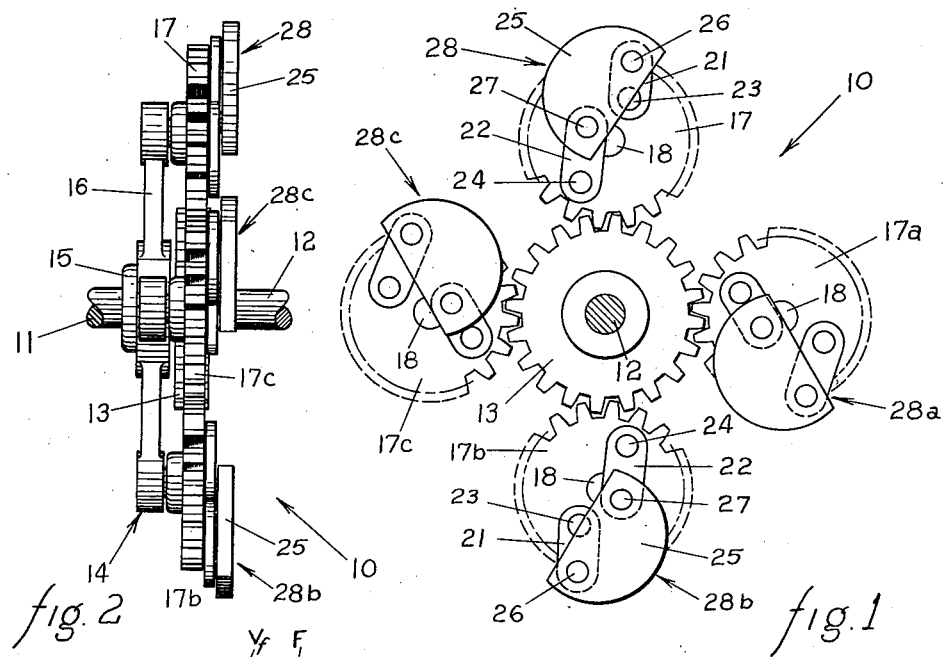
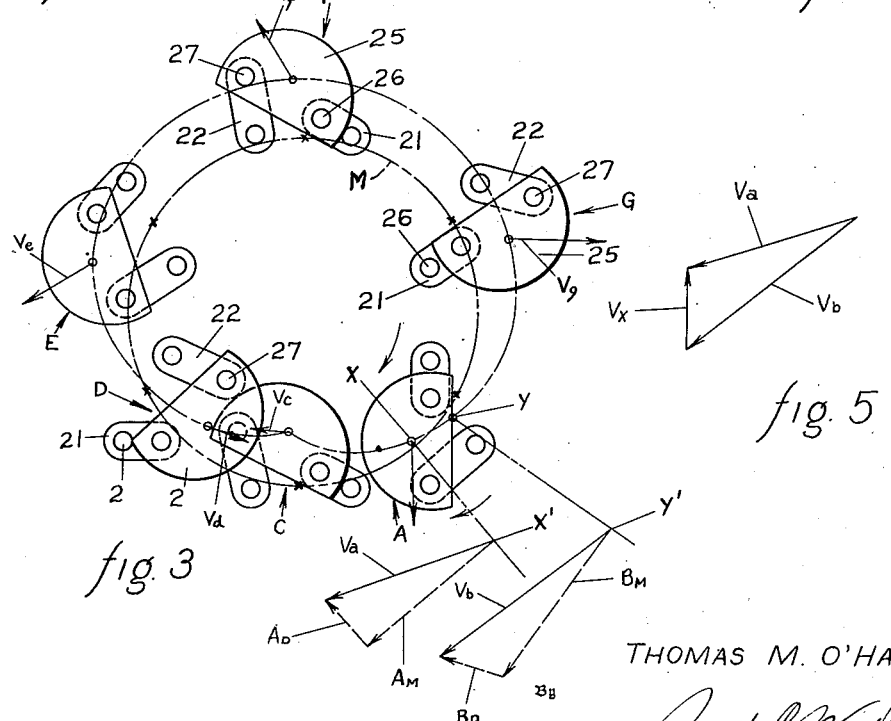
Inventor
THOMAS M. O'HARA
Attorney Aug. 14, 1951 T. M. O'HARA 2,564,211
VARIABLE-SPEED COUPLING
Filed Oct. 12, 1949 2 Sheets-Sheet 2

Inventor
THOMAS M. O'HARA
By
Attorney

Patented Aug. 14, 1951

2,564,211

UNITED STATES PATENT OFFICE 2,564,211

VARIABLE-SPEED COUPLING

Thomas M. O'Hara, Detroit, Mich.

Application October 12, 1949, Serial No. 120,880

8 Claims. (Cl. 74—752)

This invention relates in general to a variable speed coupling and more particularly to a type thereof comprised of a center gear circumferentially engaged by a plurality of planetary gears lying substantially within the plane of said center gear.

Previous attempts have been made to provide a variable speed coupling comprised of a center or driven gear circumferentially engaged by a plurality of planetary driving gears. The known arrangements include, for example, means, such as weights and centrifugally actuated friction brakes, whereby a drag or deceleration is imposed upon the rotation of said planetary gears or said center gear during a portion of their rotation. However, in each said known arrangement certain objectionable and inherent characteristics have precluded satisfactory and acceptable operation of the particular structure.

For example, friction brakes introduce the unavoidable problem of excessive wear combined with frequent need for repair and/or replacement of parts. Weights, as presently applied, effect deceleration of the rotation of the said gears during one portion of their rotation, but effect acceleration during another portion of their rotation. Such action, even though somewhat modified by the application of ratchet means, invariably results in a loss of energy, sluggishness and rough operation.

Therefore, it becomes apparent that if the acceleration effect could be eliminated from the variable speed coupling employing weights to effect deceleration, a satisfactory variable speed coupling could be provided.

Accordingly, a primary object of this invention is the provision of a completely satisfactory and mechanically operable variable speed coupling comprised of a center gear circumferentially engaged by a plurality of planetary gears, said planetary gears being provided with weight means effecting a deceleration of their rotation during a portion thereof.

A further object of this invention is the provision of a variable speed coupling having weight means, as aforesaid, effecting substantially no acceleration of said planetary gears during any portion thereof.

A further object of this invention is the provision of a variable speed coupling having weight means, as aforesaid, which is inexpensive to manufacture, simple in structure, and conducive to long, trouble-free operation.

Other objects and purposes of this invention will become apparent to persons familiar with this type of equipment upon referring to the accompanying drawings and upon reading the following specification.

In setting forth a device for accomplishing the purposes above described, I have made use of the following principles.

When a weight rotates about two axes simultaneously it not only travels in a curvilinear path but its velocity is constantly changing in both amount and direction. With a constant change in both velocity and direction there must necessarily, for reasons which are understood, be a constant change in the forces applicable to such weight. By properly controlling and utilizing these changing forces, I have found it possible to effect the purposes desired.

Where a planetary arrangement is provided in which the weight is attached rigidly to a planetary gear at a point spaced from the center of the planetary gear axis, such a weight in rotating around said axis simultaneously with the revolution of the planetary gear around the center gear will tend ultimately to aid and retard the rotation of the planetary gear. Such aiding and retarding will, if the weight is fixed to the planetary gear, be in equal amounts. However, if this force which normally tends to aid and retard the planetary rotation be modified or controlled, so that the retarding effects thereof can be maintained but the aiding effects can be reduced or eliminated, then the net effect on the planetary will be a tendency to retard its rotation. In such a way, there will then be a net retarding effect between the planetary and the center gear and the orbit of revolution of the planetary gear will be transmitted to the center gear and result in rotation thereof. Accordingly, the device hereinafter described is constructed with the usual weights mounted on the planetary gears, but so mounted that certain limited motion with respect thereto is permitted, which motion is such that when the weight is in such position that it would tend to aid rotation of the planetary gear, it is shifted so that its line of applied force coincides with a radius thereof and the applied moment is zero, and when it is in position such that it would tend to retard rotation of the planetary gear it is shifted so that said line of force is displaced from the radius parallel thereto and a moment is applied to said planetary gear. This shifting is effected by the manner of mounting and occurs automatically as rotation progresses.

In meeting those objects and purposes heretofore mentioned, as well as other incidental thereto and associated therewith, and applying the theory set forth above, I have provided a center or driven gear circumferentially engaged by a plurality of planetary or driving gears. The planetary gears are preferably rotatably supported upon the arms of a spider coaxial with, and adjacent to, said center gear. In one embodiment, said planetary gears are each provided with a weight bar which is pivotally engaged at its opposite ends by a pair of pivot links, one longer than the other, which links are pivotally secured to one side of said gear. The points of attachment of said links upon said planetary gear are preferably approximately equidistant from the axis of said gear and diametrically opposed to each other.

It will be understood that the center gear has been selected as the driven gear and the planetary gears as the driving gears for illustrative purposes only. This arrangement may be, reversed and, therefore, is not intended to limit the scope of this invention.

For illustrations of a preferred embodiment of this invention, attention is directed to the accompanying drawings in which:

Figure 1 is a side elevation view of the variable speed coupling, to which this invention relates, showing the weight bars in one set of positions with respect to their planetary gears, as well as said center gear.

Figure 2 is a top view of said speed coupling with the spider present.

Figure 3 is a partially diagrammatic illustration of the device appearing in Figure 1 and showing one weight in six of the positions occupied by it during a single revolution of its planetary gear about the center gear.

Figure 5 is a vector diagram analyzing the forces involving one weight.

Construction

Figure 4:
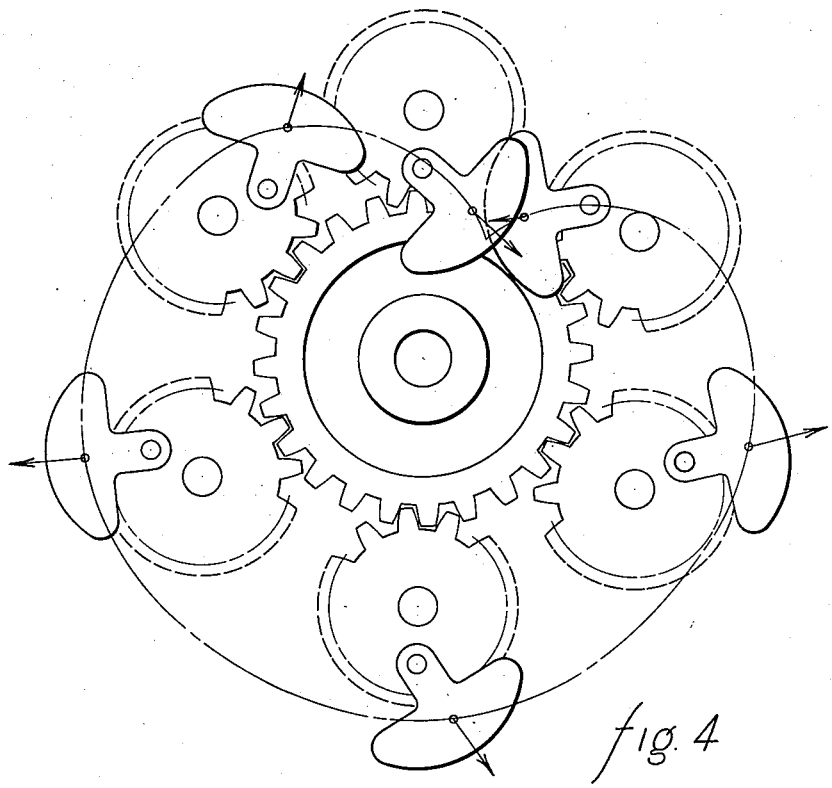
Figure 4 is a side elevation view of a modified construction showing one weight and its planetary gear in six positions around the center gear.

The variable speed coupling 10 (Figures 1, 2 and 3), as hereinbefore mentioned, and hereinafter disclosed for illustrative purposes only, is preferably interposed between and secured to the adjacent, spaced ends of a drive shaft 11 and driven shaft 12, which shafts are preferably coaxial. Said variable speed coupling is comprised of a center, or driven, center gear 13, which is secured to and rotatable with the driven shaft 12, and a drive spider 14 whose hub 15 is secured to and rotatable with the drive shaft 11. The drive spider 14 is provided with a plurality, here four, of preferably equally spaced spider arms 16 which are integral with, and extend radially and equidistantly from, the spider hub 15.

A plurality of planetary, or driving, gears, here four gears indicated as 17, 17a, 17b and 17c (Figures 1 and 3), are rotatably supported, one each, upon the spider arm 16 near the outer ends thereof by means of gear shafts 18. The said planetary gears lie substantially within a plane defined by the center gear 13 and are circumferentially engaged therewith. Said gears 17, 17a, 17b and 17c (Figures 1 and 3) are preferably substantially identical, and the center gear 13 is herein shown and described as being about twice the diameter of the planetary gears. However, such disclosure is not intended to impose any limitations upon the invention.

It will be clearly understood that the variable speed coupling 10 is herein described and disclosed as having four planetary gears, equally spaced with respect to each other about the center gear 13, for illustrative purposes only. Any number of planetary gears, one or more, may be used and spaced as desired or required with respect to each other, without departing from the scope of this invention. However, it will be apparent that if less than two planetary gears are used, or if the gears used are not equally spaced with respect to each other about the center gear, certain problems of balance will be introduced into the coupling. Therefore, in an effort to avoid such problems, I have selected an arrangement including four planetary gears equally spaced around the center gear 13.

For the purpose of convenience in description the terms "inwardly" and "outwardly" as used in the following specifications, shall be understood to mean toward and away from, respectively, the geometric center of the entire coupling or individual parts thereof, such as the gears. The terms "clockwise" and "counterclockwise" shall be understood to refer to the rotation of the variable speed coupling 10, and/or rotating parts thereof, as appearing in Figures 1 and 3.

The planetary gears 17, 17a, 17b and 17c are provided with the weight assemblies 28, 28a, 28b and 28c, respectively, each assembly being comprised of a short link 21, a long link 22, and a weight bar 25 pivotally secured together. Each planetary gear is pivotally engaged by said short pivot link 21 and said long pivot link 22 by means of suitable pivot pins at points 23 and 24, respectively, on the surface thereof remote from the spider 14. The pivot points 23 and 24 are preferably diametrically opposite to each other with respect to the axis of each planetary gear and equidistant therefrom. However, as hereinafter described, modifications of this arrangement may be made within the scope of this invention.

The pivot links 21 and 22 are pivotally secured to the weight bar 25, by means of suitable pivot pins, at the pivot points 26 and 27 remote from the pivot points 23 and 24, respectively.

The distance between the pivot points 23 and 26 of the short link 21, hereinafter called X, is preferably less than the distance between the point 23 and the axis of the corresponding planetary gear. The distance between the pivot points 24 and 27, hereinafter called Y, is preferably greater than the distance between the pivot point 24 and the axis of the said planetary gear.

The minimum distance between the pivot points 26 and 27 on the bar 25, must be larger than the distance between the pivot points 23 and 24, hereinafter called Z, plus the distance X minus the distance Y. The maximum distance between the pivot points 26 and 27 on the bar 25 must be less than the distance Z plus the distance Y minus the distance X.

Accordingly, the distance between the pivot points 26 and 27 on the bar 25 may vary in length from said minimum distance to said maximum distance, as hereinabove described. This permissible range of variation in the distance between said points 26 and 27 is equal to twice the difference between the distance Y and the distance X.

The distance between the pivot points 26 and 27 on the weight bar 25 must be greater than the said minimum distance to permit rotation of the short link 21 completely around the pivot point 23 which rotation is necessary for the satisfactory operation of the weight assembly 28. The distance between the pivot points 26 and 27 must be less than the said maximum distance to prevent rotation of the long link 22 around the pivot point 24, which, as will become apparent hereinafter, would prevent the satisfactory operation of the weight assembly 28.

The various parts of the variable speed coupling 10, such as the center gear 13, the drive spider 14, the planetary gears 17, 17a, 17b and 17c, the pivot links 21 and 22 and the weight bar 25 are preferably, but not necessarily, fabricated from a durable metal of any convenient, conventional type and in any convenient, conventional manner. The pivot pins at the pivot points 23, 24, 26 and 27 may be mounted in suitable, conventional bearings (not shown) if desired.

The said weight assemblies 28, 28a, 28b and 28c are positioned in Figure 1 as they would be found under normal operating conditions when the center gear 13 is rotating at approximately the same speed as the drive spider 14, and therefore, the planetary gears 17, 17a, 17b and 17c are rotating very slowly, if at all, about their own axes. The said weight assemblies are, in this embodiment of the invention, identical in structure and manner of support upon their corresponding planetary gears.

Operation

The variable speed coupling 10 is assembled between and upon the adjacent ends of a pair of coaxial shafts (Figure 2) preferably so that the drive spider 14 is secured to and rotatable with the drive shaft 11.

For the purposes of illustration it will be assumed that a moderate load has been imposed upon the driven shaft 11, the center gear 13 will tend to remain at rest due to the said load on said driven shaft. The planetary gears, which circumferentially engage said center gear, will be rotated about their own axes as the spider moves said planetary gears around the center gear 13.

Referring first to the construction shown in Figures 1, 2 and 3 the weight bar 25 will rigidly lock itself with respect to the planetary gear 17 and thus, if the available power is sufficient, ultimately operate at the 1 to 1 ratio between the driving and the driven members. In the construction herein illustrated and described, the weight is allowed a limited movement with respect to the planetary gear and independent of its rotation about the main and planetary axes. When the direction of force acting on the weight tends to retard the rotation on the planetary axis, the weight then becomes fixed and rotates simultaneously about both axes. When however, the direction of the force acting on the weight is reversed with respect to the planetary gear, the weight then positions itself so that the force acting on it is transmitted through the planetary gear in such a manner that it will neither aid nor retard the rotation of the planetary gear about its axis, or at least it will aid it in a lesser amount than the amount of the retarding effect above mentioned. Thus, as the planetary gear rotates about its own axis and revolves about the center gear axis, there is imposed on it a net retarding effect which is transmitted to said center gear as a driving force imposed thereon.

Referring now to Figure 3 in more detail, wherein circle M indicates the path followed by the pins 18 in revolving around the axis of shafts 11 and 12, there is shown the positions of a single weight, together with its supporting links, as it makes one complete rotation about the planetary axis together with one complete revolution about the center gear axis. Starting arbitrarily with position A and assuming the planetary gear is both rotating and revolving in a clockwise direction as indicated by the arrows in Figure 3, the forces acting thereon may be analyzed by the vector diagrams appearing in said figure. The point X, which is taken as the center of gravity of the weight in the position A, is moved to position X', for convenience in laying out a vector diagram. The vector $A_m$ illustrates the velocity of point X about the center gear axis and the vector $A_p$ illustrates the velocity of point X about the planetary gear axis. The vector $V_a$ is the resultant velocity of the point X in position A. Now taking the point Y as the position of the center of gravity of the weight bar 25 at a moment slightly earlier in the operation than occupied at point X, and denote it as position B, and similarily laying out corresponding vectors from point Y', the vector $V_b$, representing the resultant velocity of the velocities $B_m$ and $B_p$ acting on the weight at the point B, is obtained.

In Figure 5, there is illustrated by a vector diagram the relationship of certain forces. In this figure, the vectors $V_a$ and $V_b$ are combined to determine the change in velocity $V_x$ undergone by the center of gravity of said weight as it passed from point Y to point X, or from position B to position A. Since vector $V_x$ illustrates the force acting on the weight to cause it to go from its B position to its A position, it follows that the weight itself as exerted an equal and opposite force during the same interval. This force is of such direction and of such placement that it tends to cause the planetary gear to rotate in a counterclockwise direction about its own axis. Thus, as said planetary gear is caused to move about the center gear axis by the driving force applied to the system, it tends to overcome the load applied to the center gear and cause it to rotate in the same direction and at a speed corresponding to the amount of retardation effected.

Similar analysis of the forces applicable to the subsequently shown positions of the weight, as illustrated in Figure 3, produces a series of force vectors illustrated with respect to each of the positions shown in said figure. In position C the force vector $V_c$ is still such as causes a retardation of the entire planetary gear about its own axis. However, in position D the resultant force weight, as shown by the vector $V_d$, is now resisted by both of the links supporting said weight and resisted substantially equally. Thus, the force has no rotative effect on the planetary gear and will neither aid or retard its rotation. Moving now, to position E, it is observed that a similar situation exists and said planetary gear is again in the portion of its rotation where the resultant force shown by vector $V_e$, produced by the weight system would tend to aid the rotation of the planetary gear if the weight were rigidly fixed thereto. Its effect is equalized on both sides of the axis of said planetary gear and hence becomes, if not zero, at least much less than the corresponding retarding force above described. In position F the links have again resumed a position wherein the resultant force, shown by vector $V_f$, is substantially in line with only one thereof so as to concentrate its effect thereon and is also a little to one side of the center of rotation of the planetary gear. It is therefore, at this point that the retarding effect of the weight again begins to become manifest. At position G this situation has progressed somewhat further and the retarding effect is again quite strong.

Thus, in all positions of the weight with respect to the planetary gear in which, if the weight were rigidly affixed to said planetary gear, it would tend to retard the gears rotation, the weight is so secured upon the planetary gear in this construction as to also retard such rotation. However, if the weight were rigidly affixed to the planetary gear it would also accelerate the gear's rotation in certain positions and, therefore, the decelerating force of the weight would be counteracted by accelerating force thereof. However, the weight is so mounted upon the planetary gears that, as the planetary gear is caused to revolve about the center gear, the weight has a net decelerating effect upon the planetary gear and causes it to urge the center gear into such rotation that its periphery revolves about the axis of the center gear at the same velocity as the contacting teeth of the planetary gears.

It will of course, be observed that the center gear may be the driving gear and the planetary gear may be affixed to the driven mechanism without altering the theory of operation as above set forth or impairing its effectiveness.

In summary, it is apparent from the above description and disclosure that the weight assembly 28, as herein constructed, imposes a substantial decelerating moment upon the planetary gear about the axis thereof during a portion of its revolution and imposes little or no moment upon said planetary gear during the remainder of the revolution thereof. Thus, as the drive shaft is accelerated, the center gear 13 will be brought smoothly and evenly up toward the speed of the drive shaft 11 without the usual jerks and lunges found to exist in the presently known types of gear operated variable speed couplings.

It will be seen in view of the foregoing that the pivot points 23 and 24 on the planetary gears may be at different distances from the axis thereof within the scope of this invention.

In the modified form of my invention, schematically shown in Figure 4, the weight is pivotally affixed at a single point to the planetary gear. The figure shows a selected planetary gear and corresponding weight in six different positions about a center gear. By analysis similar to that outlined above, the direction and force exerted by each weight from its center of gravity is approximately that shown by the arrows leading from the center of gravity of the weight in each position illustrated. This in effect gives the weight a limited amount of movement, as in the preceding described form, in order to permit it to assume such a position at all times that minimum velocity changes will occur. Thus, it acts to retard rotation of the planetary gear more than it aids it and a net retarding effect is provided, whereby the planetary gear tends to drive the center gear and the load.

Figure 6:
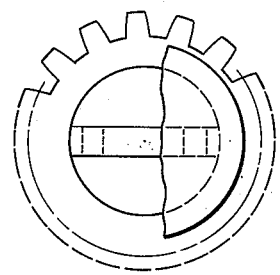
Figure 6 illustrates a form of planetary gear wherein a fluid may be substituted for the weights shown in the other figures.

Figure 6 illustrates a further modification of a planetary gear in which a fluid is used within the gear as the weight.

Although the above mentioned drawings and description apply to one particular, preferred embodiment of the invention, it is not my intention, implied or otherwise, to eliminate other variations or modifications which do not depart from the scope of the invention unless specifically stated to the contrary in the hereinafter appended claims.

I claim:

1. A variable speed coupling for connecting the adjacent ends of a pair of coaxial shafts comprising in combination: a center gear rotatable with one shaft; at least one planetary gear and means rotatably supporting said planetary gear in circumferential engagement with said center gear, said means being rotatable with the other shaft; a single, unitary weight; means movably supporting said weight, and only one said weight, directly on said planetary gear, and said means holding said weight in such position that its line of applied centrifugal force is spaced a substantial distance from the axis of said planetary gear during a substantial arc of rotation of said planetary gear during which arc said weight is moving toward the center gear to oppose such rotation, and said last-named means also holding said weight in such position that said line is spaced a lesser distance from the axis of said planetary gear during the portion of such rotation when said weight is moving away from said center gear, whereby a net retarding force is applied to the planetary gear and a net rotative force thereby applied to the center gear.

2. A variable speed coupling for connecting the adjacent ends of a pair of coaxial shafts comprising in combination: a center gear rotatable with one shaft; at least one planetary gear and means rotatably supporting said planetary gear in circumferential engagement with said center gear, said means being rotatable with the other shaft; a pair of links pivotally secured to said planetary gear at diametrically opposite points on the side thereof remote from said means; and a weight member pivotally secured to said links, the distances between the pivot points on said links and on said weight member being such that only one link can rotate entirely around its pivot point on said planetary gear.

3. A variable speed coupling for connecting the adjacent ends of a pair of coaxial shafts comprising in combination: a center gear rotatable with one shaft; a plurality of planetary gears, and means rotatably supporting said planetary gears, and means rotatably supporting said planetary gears in circumferential engagement with said center gear, said means being rotatable with the other shaft; a pair of links pivotally secured to each planetary gear at diametrically opposite points in an imaginary circle about the axis thereof and on that side thereof remote from said means; and a weight bar pivotally secured to each pair of said links, the distances between the pivot points on each pair of links and the corresponding weight bar being such that only one link of each said pair of links can rotate entirely around its pivot point on its planetary gear.

4. A variable speed coupling for connecting the adjacent ends of a pair of coaxial shafts comprising in combination: a center gear rotatable with one shaft; at least one planetary gear, and means rotatably supporting said planetary gear in circumferential engagement with said center gear, said means being rotated with the other shaft; first and second links pivotally secured to said planetary gear at diametrically opposite points on the side thereof remote from said means; and a weight member pivotally secured to said links, the distance (called A) between pivot points on the first link being less than half of the distance (called B) between the pivot points on the planetary gear and the distance (called C) between the pivot points on the second link being greater than half of distance B, and the distance between the pivot points on said weight being greater than A plus B minus C and less than C plus B minus A; whereby when said means is rotated in one direction the centrifugal force acting upon said weight opposes rotation of the planetary gear during substantially all of its rotation in said one direction and thereby effects a rotation of said center gear in said one direction.

5. In a variable speed coupling for attachment to the adjacent spaced ends of a part of coaxial shafts, the combination comprising: a center gear rotatable with one shaft; a plurality of planetary gears lying substantially within the plane of said center gear, and means rotatably supporting said planetary gears in circumferential engagement with said center gear and substantially equally spaced thereabout, said means being rotatable with the other shaft; a pair of first and second links pivotally secured to each planetary gear at diametrically opposite points in an imaginary circle about the axis thereof and on that side thereof remote from said means; a weight bar pivotally secured near its ends to said pair of links, the distance between pivot points on the first link being less than the radius of said circle and the distance between pivot points on the second link being greater than the radius of said circle, and the distance between the pivot points on said bar being greater than the sum of the distance between the pivot points on the first link and the diameter of the circle minus the distance between the pivot points on the second link and less than the sum of the distances between the pivot points on said second link and the diameter of the circle minus the distance between the pivot points on the first link; whereby, when said means is rotated in one direction, the centrifugal force resulting therefrom and acting upon said weight bar opposes the rotation of its planetary gear during substantially all of its rotation in said one direction and thereby effects a rotation of said center gear in said one direction.

6. In a variable speed coupling for attachment to the adjacent spaced ends of a pair of coaxial shafts rotatable at different speeds, the combination comprising: a driven gear securable to and rotatable with said end of one shaft; a driving gear lying substantially within the plane of said driven gear and means rotatably supporting said driving gear in circumferential engagement with said driven gear, said means being securable to and rotatable with the said end of the other shaft; a short pivot link secured to said driving gear at one point on an imaginary circle about the axis thereof and on the side thereof remote from said means; a long pivot link pivotally secured to said driving gear at another point on said circle diametrically opposite the point of securement of said driving gear of said short pivot link, a bar pivotally secured near its one end to said short link at a point thereon spaced from said one point on said circle a distance less than the radius thereof, and pivotally secured near its other end to said long link at point thereon spaced from said other point on said circle a distance greater than the radius thereof, the distance between the pivot points on said bar being less than the diameter of said circle and greater than the sum of the distance between the pivot points on said small link and the diameter of said circle minus the distance between the pivot points on said long link; whereby, when said other shaft is rotated in one direction, the centrifugal force resulting therefrom and acting upon said bar opposes the rotation of said driving gear during all but a minor portion of its rotation in said one direction and thereby effects a rotation of said driven gear in said one direction.

7. In a variable speed coupling for attachment to the adjacent spaced ends of a pair of coaxial shafts rotatable at different speeds, the combination comprising: a driven gear securable to and rotatable with said end of one of said shafts; spider having a hub and a plurality of integral, equally spaced arms extending radially and equidistantly therefrom, said hub being adjacent to said driven gear and securable to and rotatable with the said end of the other of said shafts; a plurality of driving gears lying substantially within the plane of said driven gear and positioned for circumferential engagement therewith, each of said driving gears being rotatably supported upon one of said arms; a plurality of short pivot links, one being pivotally secured to each of said driving gears at one point on an imaginary circle about the axis of said driving gears on the side thereof remote from said spider; a plurality of long pivot links, one being pivotally secured to each of said driving gears at another point on said circle diametrically opposite said one point; a plurality of elongated weight bars, one being pivotally secured near its one end to each of said short links at a point thereon spaced from said one point on said circle a distance less than the radius thereof, and said bar being pivotally secured near its other end to the corresponding long link at a point thereon spaced from said other point on said circle a distance greater than the radius thereof, the distance between the pivot points on said bar being less than the diameter of said circle and greater than the sum of the distance between the pivot points on said small link and the diameter of said circle minus the distance between the pivot points on said long link; whereby, when said spider is rotated in one direction, the force resulting therefrom and acting upon each weight bar will oppose the rotation of its corresponding driving gear during all but a minor portion of its rotation in said one direction and thereby effect a rotation of said driven gear in said one direction.

8. In a variable speed coupling for attachment to the adjacent spaced ends of a pair of coaxial shafts rotatable at different speeds, the combination comprising: a driven gear securable to and rotatable with said end of one of said shafts; a driving gear lying substantially within the plane of said driven gear and means rotatably supporting said driving gear in circumferential engagement with said driven gear, said means being securable to and rotatable with the said end of the other of said shafts; a short pivot link secured to said driving gear at one point on an imaginary circle about the axis thereof and on the side thereof remote from said means; a long pivot link pivotally secured to said driving gear at another point on said circle diametrically opposite said one point; and an elongated weight bar pivotally secured near its one end to said short link at a point thereon spaced from said one point on said circle a distance less than the radius thereof, and pivotally secured near its other end to said long link at a point thereon spaced from said other point on said circle a distance greater than the radius thereof, the distance between the pivot points on said bar being less than the diameter of said circle and greater than the sum of the distances between the pivot points on said small link and the diameter of said circle minus the distance between the pivot points on said long link; whereby, when said other shaft is rotated in one direction, the centrifugal force resulting therefrom and acting upon said bar opposes the rotation of said driving gear during all but a minor portion of its rotation in said one direction and thereby effects a rotation of said driven gear in said one direction.

THOMAS M. O'HARA.

REFERENCES CITED

The following references are of record in the file of this patent:

UNITED STATES PATENTS

| Number | Name | Date |
|---|---|---|
| 1,551,692 | Reece et al. | Sept. 1, 1925 |
| 1,551,695 | Reece et al. | Sept. 1, 1925 |
| 1,720,236 | Reece et al. | July 9, 1929 |
| 1,741,858 | McMullen | Dec. 31, 1929 |
| 1,882,181 | Democratis | Oct. 11, 1932 |
| 2,021,460 | McGill | Nov. 19, 1935 |
| 2,491,202 | O'Hara | Dec. 13, 1949 |

FOREIGN PATENTS

| Number | Country | Date |
|---|---|---|
| 564,111 | France | Oct. 13, 1923 |